United States Patent
Kosuge

(10) Patent No.: US 9,653,215 B2
(45) Date of Patent: May 16, 2017

(54) SOLID ELECTROLYTE CAPACITOR INCLUDING MULTIPLE SILANE COUPLING LAYERS PROVIDED ON A DIELECTRIC LAYER AND METHOD FOR MANUFACTURING THE SAME

(71) Applicant: Panasonic Intellectual Property Management Co., Ltd., Osaka (JP)

(72) Inventor: Keiko Kosuge, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 113 days.

(21) Appl. No.: 14/556,030

(22) Filed: Nov. 28, 2014

(65) Prior Publication Data
US 2015/0085428 A1    Mar. 26, 2015

Related U.S. Application Data

(63) Continuation of application No. PCT/JP2013/066722, filed on Jun. 18, 2013.

(30) Foreign Application Priority Data

Jun. 26, 2012  (JP) ................. 2012-143119

(51) Int. Cl.
*H01G 9/07*    (2006.01)
*H01G 9/00*    (2006.01)
(Continued)

(52) U.S. Cl.
CPC ............ *H01G 9/07* (2013.01); *H01G 9/0032* (2013.01); *H01G 9/0036* (2013.01);
(Continued)

(58) Field of Classification Search
CPC .......... H01G 9/07; H01G 9/028; H01G 9/025; H01G 9/04; H01G 9/0032; H01G 9/0036; H01G 9/15
See application file for complete search history.

(56) References Cited

U.S. PATENT DOCUMENTS

| | | | |
|---|---|---|---|
| 6,215,651 B1 * | 4/2001 | Takada ................. | H01G 9/025 361/523 |
| 6,602,741 B1 | 8/2003 | Kudoh et al. | |
| | | (Continued) | |

FOREIGN PATENT DOCUMENTS

| | | |
|---|---|---|
| JP | 2-074021 | 3/1990 |
| JP | 09246106 A * | 9/1997 |
| | (Continued) | |

OTHER PUBLICATIONS

International Search Report of PCT application No. PCT/JP2013/066722 dated Aug. 6, 2013.

*Primary Examiner* — David M Sinclair
(74) *Attorney, Agent, or Firm* — McDermott Will & Emery LLP

(57) ABSTRACT

A solid electrolytic capacitor comprises a positive electrode, a dielectric layer, a silane coupling layer, a conductive polymer layer, and a negative electrode layer. The dielectric layer is provided on the positive electrode. The silane coupling layer is provided on the dielectric layer. The conductive polymer layer is provided on the silane coupling layer. The negative electrode layer is provided on the conductive polymer layer. The silane coupling layer comprises a first silane coupling layer and a second silane coupling layer. The first silane coupling layer covers a part of a surface of the dielectric layer facing the conductive polymer layer. The second silane coupling layer covers at least a part of a portion exposed from the first silane (Continued)

coupling layer on the surface of the dielectric layer facing the conductive polymer layer.

13 Claims, 3 Drawing Sheets

(51) Int. Cl.
*H01G 9/15* (2006.01)
*H01G 9/025* (2006.01)
*H01G 9/04* (2006.01)
*H01G 9/028* (2006.01)

(52) U.S. Cl.
CPC ............ *H01G 9/025* (2013.01); *H01G 9/028* (2013.01); *H01G 9/04* (2013.01); *H01G 9/15* (2013.01)

(56) References Cited

U.S. PATENT DOCUMENTS

| | | | |
|---|---|---|---|
| 2002/0105776 A1* | 8/2002 | Komatsuki | H01G 9/10 361/518 |
| 2003/0147202 A1 | 8/2003 | Kudoh et al. | |
| 2004/0184221 A1 | 9/2004 | Kudoh et al. | |
| 2005/0141173 A1 | 6/2005 | Tseng et al. | |
| 2009/0270590 A1* | 10/2009 | Jun | C03C 17/009 530/345 |
| 2012/0218681 A1 | 8/2012 | Kosuge et al. | |

FOREIGN PATENT DOCUMENTS

| | | |
|---|---|---|
| JP | 11-219860 | 8/1999 |
| JP | 2001-326145 | 11/2001 |
| JP | 2008-244400 | 10/2008 |
| JP | 2009-246138 | 10/2009 |
| JP | 2012-178459 | 9/2012 |

* cited by examiner

SOLID ELECTROLYTE CAPACITOR INCLUDING MULTIPLE SILANE COUPLING LAYERS PROVIDED ON A DIELECTRIC LAYER AND METHOD FOR MANUFACTURING THE SAME

RELATED APPLICATIONS

This application is a Continuation of International Application No. PCT/JP2013/066722, filed on Jun. 18, 2013, which in turn claims the benefit of Japanese Application No. 2012-143119, filed on Jun. 26, 2012, the disclosures of which Applications are incorporated by reference herein.

FIELD OF THE INVENTION

The present invention relates to a solid electrolytic capacitor and a method for manufacturing the same.

BACKGROUND

Recently, as electronic equipment has been reduced in size, small-sized high-frequency capacitors having large capacitance have been demanded. As such capacitors, a solid electrolytic capacitor using a solid electrolyte layer made of a conductive polymer has been proposed, which comprises a positive electrode, a dielectric layer, and the solid electrolyte layer that is formed on the dielectric layer. In the solid electrolytic capacitor, the positive electrode is composed of a sintered body of valve metal such as tantalum, niobium, titanium, and aluminum, and then the dielectric layer is formed by anodizing a surface of the positive electrode. By using a conductive polymer layer as the solid electrolyte layer, equivalent series resistance (ESR) of the solid electrolytic capacitor can be reduced. However, the conductive polymer layer made of organic material may not enough strongly adhere to the dielectric layer made of inorganic material.

In Japanese Patent Unexamined Publication No. H2-74021, it has been proposed that an adhesion between a dielectric layer and a conductive polymer layer can be improved by a surface treatment with a silane coupling agent to the dielectric layer.

SUMMARY

Adhesion between a dielectric layer and a conductive polymer layer is required to be further improved.

A main object of the present invention is to provide a solid electrolytic capacitor in which adhesion between a dielectric layer and a conductive polymer layer is high, and capacitance does not easily decline after long time use.

A solid electrolytic capacitor in accordance with the present invention includes a positive electrode, a dielectric layer, a silane coupling layer, a conductive polymer layer, and a negative electrode layer. The dielectric layer is provided on the positive electrode. The silane coupling layer is provided on the dielectric layer. The conductive polymer layer is provided on the silane coupling layer. The negative electrode layer is provided on the conductive polymer layer. The silane coupling layer includes a first silane coupling layer and a second silane coupling layer. The first silane coupling layer covers a part of a surface of the dielectric layer facing the conductive polymer layer. The second silane coupling layer covers at least a part of an exposed portion from the first silane coupling layer on the surface of the dielectric layer facing the conductive polymer layer.

In a method for manufacturing a solid electrolytic capacitor in accordance with the present invention, a dielectric layer is formed on a positive electrode. A first silane coupling layer is formed on a part of a surface of the dielectric layer, and a second silane coupling layer is formed on at least a part of an exposed portion from the first silane coupling layer on the surface of the dielectric layer. A conductive polymer layer is formed on the first and the second silane coupling layers. A negative electrode layer is formed on the conductive polymer layer.

In the present invention, on the surface of the dielectric layer facing the conductive polymer layer, the second silane coupling layer is provided to cover at least a part of the exposed portion from the first silane coupling layer. Therefore, a coverage ratio of the silane coupling layer to the surface of the dielectric layer facing the conductive polymer layer can be enhanced. As a result, it is possible to provide a solid electrolytic capacitor in which adhesion between a dielectric layer and a conductive polymer layer is high, and capacitance does not easily decline after long time use.

DESCRIPTION OF EMBODIMENTS

Figure 1:
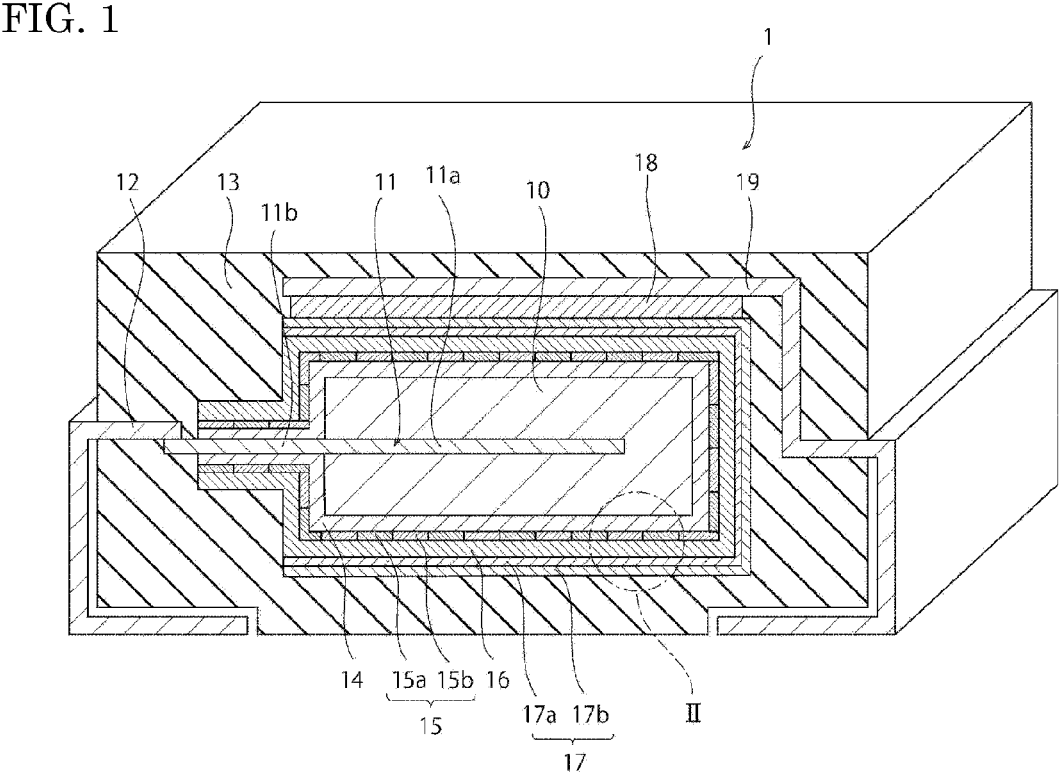
FIG. 1 is a schematic sectional view of a solid electrolytic capacitor in an exemplary embodiment of the present invention.

Hereinafter, one example of preferable exemplary embodiments for carrying out the present invention is described. However, the below mentioned exemplary embodiments are just examples. The present invention is not limited to the below mentioned exemplary embodiments.

Furthermore, in the drawings with which the exemplary embodiments refer to, the same reference numerals are given to the same members having the same functions. Furthermore, the drawings which are referred to in the exemplary embodiments and the like are shown schematically. The ratio of dimensions of objects drawn in the drawings may be different from the ratio of dimensions of actual objects. Also among the drawings, ratios of the dimensions of the objects may be different from each other. The ratio of dimensions of the specific objects should be determined with reference to the following description.

Exemplary Embodiment

Configuration of Solid Electrolytic Capacitor 1

Figure 2:
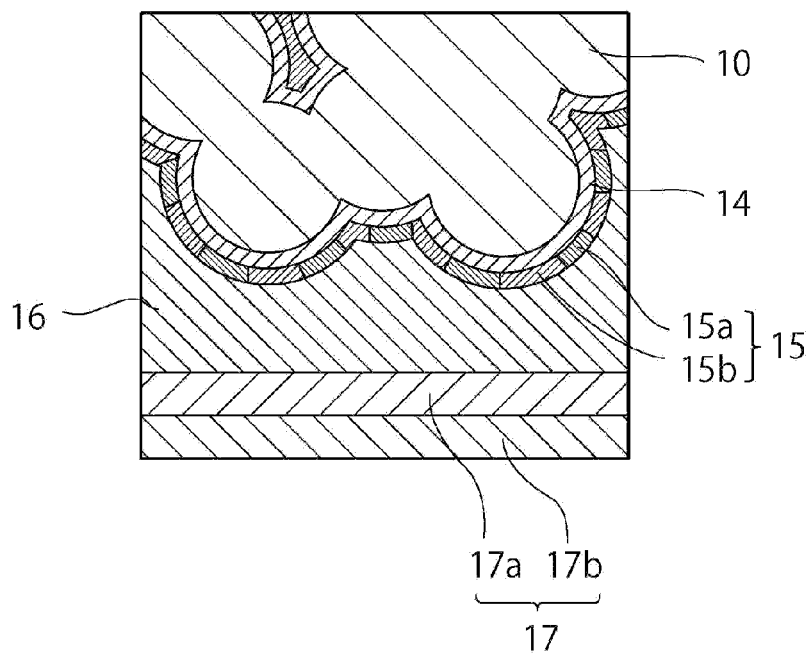
FIG. 2 is an enlarged schematic sectional view of portion II shown in FIG. 1.

As shown in FIGS. 1 and 2, solid electrolytic capacitor 1 comprises positive electrode 10. Positive electrode 10 includes valve metal. Positive electrode 10 may be substantially composed of valve metal, or may be composed of an alloy including valve metal. Specific examples of valve metal preferably used for material constituting positive electrode 10 are tantalum, niobium, titanium, aluminum, hafnium, zirconium, zinc, tungsten, bismuth, antimony, and the like. Among them, tantalum, niobium, titanium, and aluminum are preferably used because oxides thereof have a high dielectric constant and raw material thereof is easily available. Examples of the alloy including valve metal include an alloy including tantalum and niobium. It is preferable that the alloy including valve metal includes valve metal as a main component, that is, includes not less than 50 atom % of the valve metal in the alloy.

In this exemplary embodiment, as shown in FIG. 2, positive electrode 10 is made of a porous body having a plurality of internal pores. Positive electrode 10 can be produced, for example, by sintering a molded product obtained by molding material powder including valve metal. The outer shape of positive electrode 10 is a substantially rectangular parallelepiped shape.

Note here that in the present invention, the positive electrode is not necessarily made of a porous body. The positive electrode may be made of, for example, a metal foil including valve metal. It is preferable that the metal foil is wrapped or folded several times.

As shown in FIG. 1, positive electrode lead 11 is electrically connected to positive electrode 10. Positive electrode lead 11 has a rod shape. First portion 11a of positive electrode lead 11 is embedded in positive electrode 10. Positive electrode lead 11 is electrically connected to positive electrode 10 at portion 11a. Second portion 11b of positive electrode lead 11 protrudes from an end face of positive electrode 10. Second portion 11b of positive electrode lead 11 is electrically connected to positive electrode terminal 12. Positive electrode terminal 12 is led out to the outside of resin outer package 13 mentioned below.

Dielectric layer 14 is provided on positive electrode 10. Dielectric layer 14 covers the surface of positive electrode 10. FIG. 1 schematically shows that dielectric layer 14 seems to be provided only on the outer surface of positive electrode 10, but specifically as shown in FIG. 2, dielectric layer 14 is provided not only on the outer surface of positive electrode 10 but also on an inner surface of positive electrode 10. That is to say, dielectric layer 14 is also provided to the inner surface of internal pores formed in positive electrode 10. Such dielectric layer 14 can be formed, for example, by subjecting positive electrode 10 to anodization (chemical conversion treatment). The anodization of positive electrode 10 can be carried out, for example, by bringing the surface of positive electrode 10 into contact with a phosphoric acid aqueous solution and the like.

Silane coupling layer 15 is provided on dielectric layer 14. Conductive polymer layer 16 and negative electrode layer 17 are provided on silane coupling layer 15 sequentially in this order.

Silane coupling layer 15 is provided not only on the outer surface of dielectric layer 14 but also on the inner surface of dielectric layer 14. Silane coupling layer 15 covers substantially the entire surface of dielectric layer 14 including the outer surface and the inner surface.

Silane coupling layer 15 is provided to improve adhesion between dielectric layer 14 and conductive polymer layer 16. Silane coupling layer 15 is formed by applying a solution including a silane coupling agent onto dielectric layer 14.

Silane coupling layer 15 comprises first silane coupling layer 15a and second silane coupling layer 15b. First silane coupling layer 15a covers a part of a surface of dielectric layer 14 facing conductive polymer layer 16. Therefore, a part of the surface of dielectric layer 14 is exposed from first silane coupling layer 15a. Second silane coupling layer 15b covers at least a part of an exposed portion from first silane coupling layer 15a on the surface of dielectric layer 14 facing conductive polymer layer 16. In this exemplary embodiment, first silane coupling layer 15a and second silane coupling layer 15b cover substantially the entire surface of dielectric layer 14 facing conductive polymer layer 16.

Note here that second silane coupling layer 15b covers at least the part of the exposed portion from first silane coupling layer 15a on the surface of dielectric layer 14 facing conductive polymer layer 16, while second silane coupling layer 15b may further cover at least a part of first silane coupling layer 15a.

Types of the silane coupling agents for forming silane coupling layer 15 are not particularly limited. Examples of the silane coupling agents preferably used for forming silane coupling layer 15 include a silane coupling agent including an alkoxysilane group, an acetoxysilane group, or a halide silane group, and the like. Specific examples of the silane coupling agent preferably used for forming silane coupling layer 15 are aminopropyltriethoxysilane, octadecyltriethoxysilane, n-propyl trichlorosilane, mercaptopropyl trimethoxy silane, dimethoxy diphenyl silane, methylphenyl dichlorosilane, and the like.

The silane coupling agent for forming first silane coupling layer 15a and the silane coupling agent for forming second silane coupling layer 15b may be the same as each other or may be different from each other. The silane coupling agent may be one type or plural types thereof for forming first silane coupling layer 15a and for forming second silane coupling layer 15b, respectively.

A thickness of each of first silane coupling layer 15a and second silane coupling layer 15b is preferably, for example, in a range from 0.5 nm to 100 nm, and more preferably in a range from 0.5 nm to 10 nm. Note here that a thickness of silane coupling layer 15 can be measured by, for example, an X-ray photoelectron spectroscopic analysis or an analysis using a stylus type step profiler.

Conductive polymer layer 16 is provided on silane coupling layer 15. Conductive polymer layer 16 includes a conductive polymer. Specific examples of the conductive polymer preferably used for conductive polymer layer 16 are polypyrrole, polythiophene, polyethylene dioxythiophene, polyaniline, polyacetylene, polythienylene vinylene, a fluorene copolymer, polyvinyl carbazole, polyvinyl phenol, polyfluorene, and derivatives thereof, polyphenylene and derivatives thereof, a phenylene copolymer, polyparaphenylene vinylene and derivatives thereof, a phenylenevinylene copolymer, polypyridine, and derivatives thereof, a pyridine copolymer, and the like.

Note here that conductive polymer layer 16 may be made of a single layer, or a laminated body of plural layers.

Negative electrode layer 17 is provided on conductive polymer layer 16. Negative electrode layer 17 includes carbon layer 17a and silver layer 17b. Carbon layer 17a is provided on conductive polymer layer 16. Carbon layer 17a is formed by applying carbon paste and drying the paste. Silver layer 17b is provided on carbon layer 17a. Silver layer 17b is formed by applying silver paste and drying the paste.

As shown in FIG. 1, negative electrode terminal 19 is electrically connected to negative electrode layer 17. Negative electrode terminal 19 and negative electrode layer 17 are adhesively bonded to each other with conductive adhesive layer 18 including a cured product of a conductive adhesive. Negative electrode terminal 19 is led out to the outside of molded resin outer package 13.

Positive electrode 10, positive electrode lead 11, dielectric layer 14, silane coupling layer 15, conductive polymer layer 16, and negative electrode layer 17 are sealed by molded resin outer package 13 made of appropriate resin.

(Method for Manufacturing Solid Electrolytic Capacitor 1)

Next, one example of a method for manufacturing solid electrolytic capacitor 1 is described.

Firstly, positive electrode 10 is produced in which a part of positive electrode lead 11 is embedded. Specifically, positive electrode 10 can be produced by the following procedures. Positive electrode 10 can be produced by firstly molding, for example, powder of material including valve metal into a desired shape in which a part of positive electrode lead 11 is embedded so as to obtain a molded product, and then sintering the molded product so as to produce positive electrode 10 in which a part of positive electrode lead 11 is embedded.

Next, positive electrode 10 is subjected to anodization (chemical conversion treatment) to form dielectric layer 14 on a surface of positive electrode 10. The anodization of positive electrode 10 can be carried out by, for example, applying a voltage to the surface of positive electrode 10 while the surface is brought into contact with a phosphoric acid aqueous solution and the like. Thereafter, positive electrode 10 having dielectric layer 14 formed on its surface is washed and dried if necessary.

Next, silane coupling layer 15 is formed on dielectric layer 14. Specifically, first silane coupling layer 15*a* is formed on a part of a surface of dielectric layer 14, and second silane coupling layer 15*b* is formed on at least a part of an exposed portion from first silane coupling layer 15*a* on the surface of dielectric layer 14.

More specifically, firstly, a silane coupling agent for forming first silane coupling layer 15*a* (hereinafter, referred to as a "first silane coupling agent") is added to a solvent such as water and ethanol so as to make a solution (hereinafter, referred to as a "first silane coupling agent solution"). Then dielectric layer 14 is immersed into the first silane coupling agent solution so as to apply the first silane coupling agent solution onto dielectric layer 14. Thereafter, drying, cooling, washing and drying are appropriately carried out if necessary, thereby forming first silane coupling layer 15*a*. Specifically, silanol groups are generated by hydrolysis of the first silane coupling agent in the first silane coupling agent solution. In general, the silanol groups undergo a dehydration-condensation reaction with hydroxyl groups existing on the surface of dielectric layer 14 composed of metallic oxide. Thus, a covalent bond (a surface of —Si—O— dielectric layer) is formed between the first silane coupling agent and the surface of dielectric layer 14. Therefore, first silane coupling layer 15*a* is preferentially formed to a part having a large number of hydroxyl groups on the surface of dielectric layer 14, and is not likely to be formed to a part having few hydroxyl groups.

Note here that the first silane coupling agent solution can be made by dissolving the first silane coupling agent in an organic solvent or an aqueous solvent. The concentration of the first silane coupling agent in the first silane coupling agent solution is not particularly limited, but the concentration is preferably, for example, in the range from 0.1 mM (0.1 mmol/l) to 0.5 M (0.5 mol/l). Immersion time of dielectric layer 14 in the first silane coupling agent solution is not particularly limited, but the time can be, for example, about one minute to one hour. A drying temperature of the applied first silane coupling agent solution can be, for example, about 100° C. to 150° C. If the concentration of the first silane coupling agent in the first silane coupling agent solution is lowered and the immersion time is reduced, it is possible to form first silane coupling layer 15*a* having a single-molecular level thickness. In this case, the thickness of first silane coupling layer 15*a* is about 0.5 nm to 1 nm. When the concentration of the first silane coupling agent in the first silane coupling agent solution is increased, the immersion time is increased, and drying treatment is carried out at a high temperature of about 100° C. to 150° C., silanol groups (Si—OH) generated by hydrolysis of the first silane coupling agent are condensed and they form a plurality of siloxane bonds (Si—O—Si). Thus, the thickness of first silane coupling layer 15*a* can be increased. As mentioned above, the thickness of first silane coupling layer 15*a* can be appropriately adjusted by the concentration of the first silane coupling agent in the first silane coupling agent solution, the immersion time, drying conditions such as a drying temperature, and the like.

As mentioned above, in general, the silane coupling agent undergoes a dehydration-condensation reaction with hydroxyl groups existing on the surface of dielectric layer 14 composed of metallic oxide, so that a covalent bond is formed (a surface of —Si—O— dielectric layer).

Figure 3:
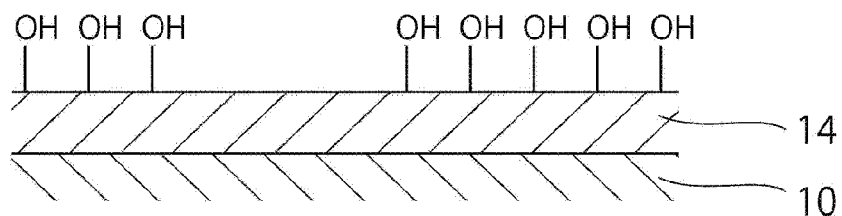
FIG. 3 is a schematic sectional view showing a dielectric layer before a first silane coupling layer is formed.
Figure 4:
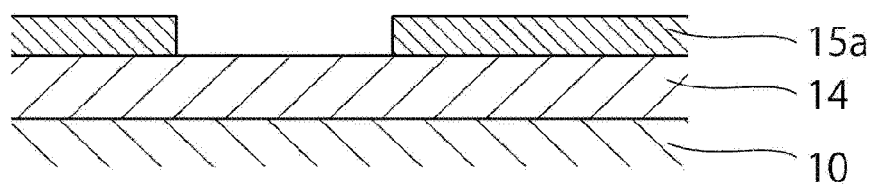
FIG. 4 is a schematic sectional view of the first silane coupling layer and the dielectric layer.

However, hydroxyl groups are not uniformly distributed on the surface of dielectric layer 14. As schematically shown in FIG. 3, in general, the surface of dielectric layer 14 includes a part in which a large number of hydroxyl groups are distributed and a part in which few hydroxyl groups are distributed. Therefore, as shown in FIG. 4, first silane coupling layer 15*a* is formed to a portion having a large number of hydroxyl groups in the surface of dielectric layer 14, whereas first silane coupling layer 15*a* is not formed on a portion having few hydroxyl groups in the surface of dielectric layer 14.

Figure 5:
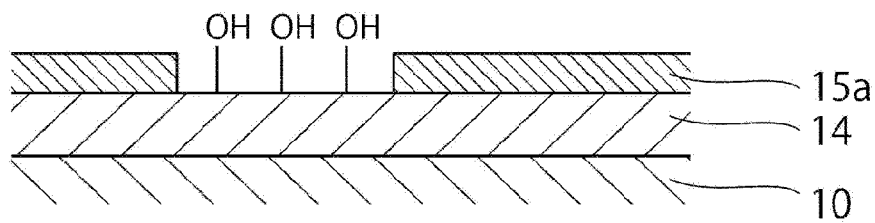
FIG. 5 is a schematic sectional view showing the dielectric layer before a second silane coupling layer is formed.

Next, as shown in FIG. 5, hydroxyl groups are formed to an exposed portion from first silane coupling layer 15*a* on the surface of dielectric layer 14. Formation of hydroxyl groups can be carried out by, for example, immersing dielectric layer 14 with first silane coupling layer 15*a* into an acid solution. After dielectric layer 14 is immersed into the acid solution, a drying step and, for example, a washing step using ethanol and the like may be appropriately carried out if necessary.

Note here that examples of preferable acid solutions include a mixed acid aqueous solution obtained by mixing sulfuric acid and hydrogen peroxide with each other. The mixed acid aqueous solution of sulfuric acid and hydrogen peroxide acts as a strong oxidizer, and adds hydroxyl groups to the surface of dielectric layer 14. Specifically, when hydrogen peroxide coexists with sulfuric acid that is a strong acid, hydroxyl radical (—OH) is generated, the surface of dielectric layer 14 is oxidized by the hydroxyl radical, so that hydroxyl groups are introduced to the surface.

The concentration of sulfuric acid in the mixed acid aqueous solution of sulfuric acid and hydrogen peroxide is not particularly limited, but the concentration can be, for example, about 0.1 mass % to 10 mass %. The concentration of hydrogen peroxide in the mixed acid aqueous solution of sulfuric acid and hydrogen peroxide is not particularly limited, but the concentration can be, for example, about 1 mass % to 30 mass %. The immersion time of dielectric layer 14 in the acid solution is not particularly limited, but the time can be, for example, about five minutes to two hours. Time for washing dielectric layer 14 with water after dielectric layer 14 is immersed into the acid solution is not particularly limited, but the time can be, for example, about five minutes to 30 minutes. The drying temperature thereafter is not particularly limited, but the temperature can be, for example, about 100° C. to 120° C. The drying time is not particularly limited, but the time can be about five minutes to 30 minutes.

Examples of other methods for introducing the hydroxyl group may include a method for surface treatment using mercapto ethanol, and a method for exposing hydroxyl groups again by removing attached products attached on the surface of dielectric layer 14.

Figure 6:
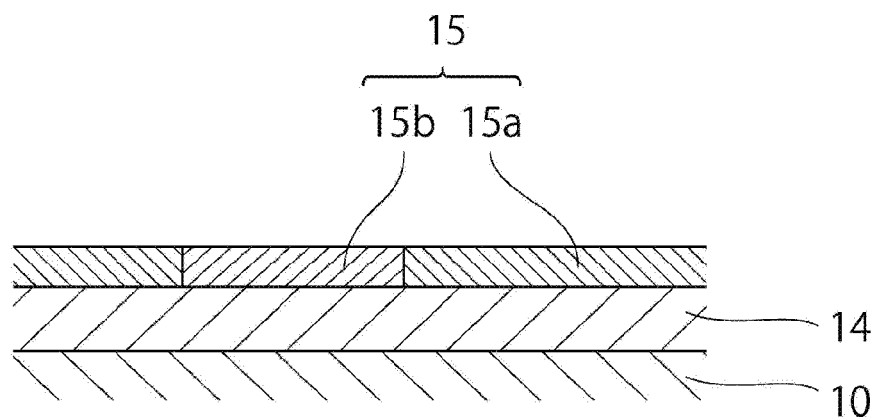
FIG. 6 is a schematic sectional view of the first and the second silane coupling layers and the dielectric layer.

Next, as shown in FIG. 6, second silane coupling layer 15b is formed to the portion exposed from first silane coupling layer 15a on dielectric layer 14. Specifically, firstly, a silane coupling agent for forming second silane coupling layer 15b (hereinafter, referred to as a "second silane coupling agent") is added to a solvent such as water and ethanol so as to make a solution (hereinafter, referred to as a "second silane coupling agent solution"). Then dielectric layer 14 is immersed into the second silane coupling agent solution so as to apply the second silane coupling agent solution onto dielectric layer 14. Thereafter, drying, cooling, and washing and drying are appropriately carried out if necessary, and thereby, second silane coupling layer 15b is formed.

Note here that the second silane coupling agent solution can be prepared by dissolving the second silane coupling agent in an organic solvent or an aqueous solvent. The concentration of the second silane coupling agent in the second silane coupling agent solution is not particularly limited, but the concentration is preferably, for example, in the range from 0.1 mM (0.1 mmol/l) to 0.5 M (0.5 mol/l). Immersion time of dielectric layer 14 in the second silane coupling agent solution is not particularly limited, but the time can be, for example, about one minute to one hour. A drying temperature for the applied second silane coupling agent solution can be, for example, about 100° C. to 150° C. If the concentration of the second silane coupling agent in the second silane coupling agent solution is lowered and the immersion time is reduced, it is possible to form second silane coupling layer 15b having a single-molecular level thickness. In this case, the thickness of second silane coupling layer 15b is about 0.5 nm to 1 nm. When the concentration of the second silane coupling agent in the second silane coupling agent solution is increased, the immersion time is increased, and the drying treatment is carried out at a high temperature of about 100° C. to 150° C., silanol groups (Si—OH) generated by hydrolysis of the second silane coupling agent are condensed and they form a plurality of siloxane bonds (Si—O—Si). Thus, the thickness of second silane coupling layer 15b can be increased. As mentioned above, the thickness of second silane coupling layer 15b can be appropriately adjusted by the concentration of the second silane coupling agent in the second silane coupling agent solution, the immersion time, drying conditions such as a drying temperature, and the like. Note here that in this exemplary embodiment, first silane coupling layer 15a and second silane coupling layer 15b are partially bonded to each other by a siloxane bond or by an intermolecular force. Thus, adhesion between first silane coupling layer 15a and second silane coupling layer 15b is enhanced.

After silane coupling layer 15 is formed, conductive polymer layer 16 shown in FIGS. 1 and 2 is formed. Conductive polymer layer 16 can be formed by, for example, chemical polymerization, electrolytic polymerization, and the like.

Thereafter, carbon paste is applied onto conductive polymer layer 16 and dried so as to form carbon layer 17a.

Thereafter, silver paste is applied onto carbon layer 17a and dried so as to form silver layer 17b.

Next, negative electrode terminal 19 is provided on silver layer 17b with a conductive adhesive interposed therebetween. Then, the conductive adhesive is cured to form conductive adhesive layer 18. Thus, negative electrode terminal 19 is electrically connected and adhesively bonded to silver layer 17b.

Finally, molded resin outer package 13 is formed by molding. Thus, solid electrolytic capacitor 1 can be completed.

As mentioned above, before second silane coupling layer 15b is formed, hydroxyl groups are introduced into the exposed portion from first silane coupling layer 15a of dielectric layer 14. Therefore, second silane coupling layer 15b is suitably formed also to the exposed portion from first silane coupling layer 15a on the surface of dielectric layer 14. Therefore, when second silane coupling layer 15b, in addition to first silane coupling layer 15a, are provided, a coverage ratio of silane coupling layer 15 to dielectric layer 14 can be enhanced. Therefore, the adhesion between dielectric layer 14 and conductive polymer layer 16 can be improved. As a result, it is possible to achieve solid electrolytic capacitor 1 whose capacitance does not easily decline after long time use. Furthermore, since silane coupling layer 15 has excellent insulation property, voltage endurance characteristics of solid electrolytic capacitor 1 is also improved by increasing the coverage ratio of silane coupling layer 15 to dielectric layer 14.

Note here that an entire surface of dielectric layer 14 is not necessarily covered with first silane coupling layer 15a and second silane coupling layer 15b. Furthermore, when second silane coupling layer 15b covers at least a part of the exposed portion from first silane coupling layer 15a of layer 14, an effect of improving the above-mentioned adhesion and voltage endurance characteristics can be obtained.

Furthermore, by increasing the thicknesses of first silane coupling layer 15a and second silane coupling layer 15b, the voltage endurance characteristics can be improved.

If the concentration of the first silane coupling agent in the first silane coupling agent solution, the immersion time, and the drying conditions such as a drying temperature are adjusted, the thickness of first silane coupling layer 15a and the thickness of second silane coupling layer 15b can be changed respectively. This can make the surface of silane coupling layer 15 rough, and a contact area between silane coupling layer 15 and conductive polymer layer 16 can be increased. Therefore, the adhesion between silane coupling layer 15 and conductive polymer layer 16 can be enhanced.

Furthermore, when first silane coupling layer 15a and second silane coupling layer 15b are formed by using different silane coupling agents from each other, different reactive functional groups can be formed on the surface of silane coupling layer 15. Thus, plural functions are imparted to the surface of silane coupling layer 15. For example, when first silane coupling layer 15a is formed by using a silane coupling agent having a wettability-improving effect and second silane coupling layer 15b is formed by using a silane coupling agent having an adhesiveness-improving effect, conductive polymer layer 16 is easily formed by the wettability-improving effect, and the adhesion between silane coupling layer 15 and conductive polymer layer 16 can also be made to be stronger. Thus, when the above-mentioned silane coupling layer 15 is formed by using a plurality of silane coupling agents, the adhesion between coupling layer 15 and conductive polymer layer 16 can be also enhanced. Note here that examples of the silane coupling agent having the wettability-improving effect include 3-aminopropyl trimethoxy silane and the like. Examples of the silane coupling agent for enhancing the adhesion include 3-mercapto trimethoxy silane and the like.

Hereinafter, modifications are described. In the following description, the same reference numerals are given to members having substantially the same functions as in the exemplary embodiments, and the description thereof is omitted.

First Modification

The above-mentioned exemplary embodiment describes an example in which second silane coupling layer 15b is provided only to an exposed portion from first silane coupling layer 15a on dielectric layer 14. However, the present invention is not limited to this configuration.

Figure 7:
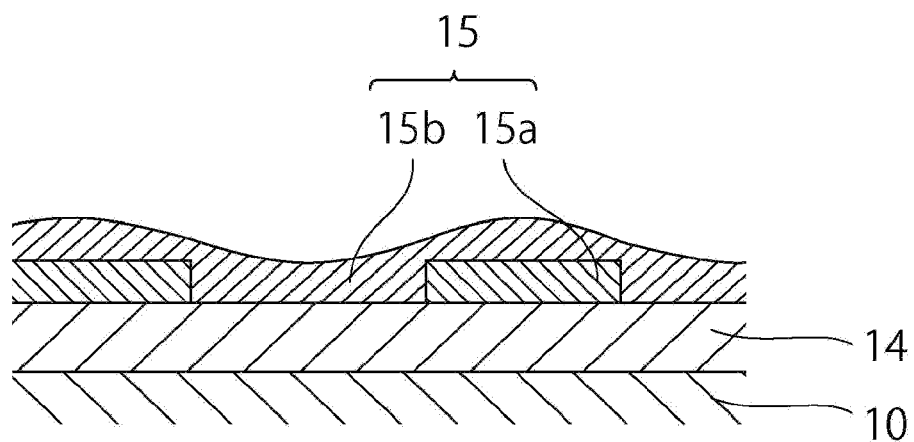
FIG. 7 is a schematic sectional view for illustrating a silane coupling layer in a first modification.

For example, as shown in FIG. 7, second silane coupling layer 15b may cover at least a part of the exposed portion from first silane coupling layer 15a on dielectric layer 14 and may cover at least a part of the surface of first silane coupling layer 15. Second silane coupling layer 15b may cover substantially the entire dielectric layer 14 including a part over first silane coupling layer 15a. Also in this case, the same advantageous effect as in the exemplary embodiment can be obtained.

Note here that in this modification, first silane coupling layer 15a and second silane coupling layer 15b are partially bonded to each other by a siloxane bond or by an intermolecular force. Thus, adhesion between first silane coupling layer 15a and second silane coupling layer 15b is enhanced.

Furthermore, second silane coupling layer 15b covers at least a part of an exposed portion from first silane coupling layer 15a on dielectric layer 14 while it covers at least a part of the surface of first silane coupling layer 15a. This can make the surface of silane coupling layer 15 rough, and a contact area between silane coupling layer 15 and conductive polymer layer 16 can be increased. Therefore, the adhesion between coupling layer 15 and conductive polymer layer 16 can be further enhanced.

Second Modification

The above-mentioned exemplary embodiment describes an example in which silane coupling layer 15 is made of two silane coupling layers, that is, first silane coupling layer 15a and second silane coupling layer 15b. Note that, in the present invention, the silane coupling layer may be made of three layers or more of silane coupling layers. For example, after the first silane coupling layer is formed, introduction of hydroxyl groups and further formation of a silane coupling layer may be carried out repeatedly a plurality of times.

Figure 8:
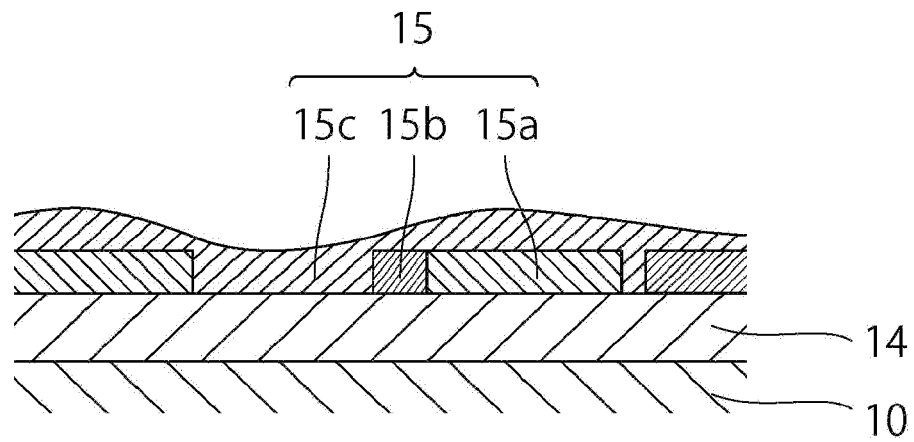
FIG. 8 is a schematic sectional view for illustrating a silane coupling layer in a second modification.

For example, in an example shown in FIG. 8, silane coupling layer 15 comprises first silane coupling layer 15a, second silane coupling layer 15b, and third silane coupling layer 15c. In this modification, second silane coupling layer 15b covers a part of an exposed portion from first silane coupling layer 15a on the surface of dielectric layer 14 facing conductive polymer layer 16. Therefore, a part of the surface of dielectric layer 14 facing conductive polymer layer 16 is exposed from first silane coupling layer 15a and second silane coupling layer 15b. Third silane coupling layer 15c covers at least a part of an exposed portion from first silane coupling layer 15a and second silane coupling layer 15b on the surface of dielectric layer 14 facing conductive polymer layer 16.

In this modification, for example, a silane coupling agent for forming third silane coupling layer 15c (hereinafter, referred to as a "third silane coupling agent") is added to a solvent such as water and ethanol so as to make a solution (hereinafter, referred to as a "third silane coupling agent solution"). After second silane coupling layer 15b is formed, dielectric layer 14 is immersed into the third silane coupling agent solution so as to apply the third silane coupling agent solution onto dielectric layer 14. Thereafter, drying, cooling, and washing and drying are appropriately carried out if necessary, thereby forming third silane coupling layer 15c.

Formation of third silane coupling layer 15c may be carried out immediately after the formation of second silane coupling layer 15b. However, it is preferable that the formation of third silane coupling layer 15c is carried out after introduction of hydroxyl groups is carried out.

Third silane coupling layer 15c may cover only the exposed portion from first silane coupling layer 15a and second silane coupling layer 15b on the surface of dielectric layer 14 or may also cover a part of at least one of first silane coupling layer 15a and second silane coupling layer 15b.

As in this modification, by providing three layers or more of silane coupling layers, a coverage ratio of silane coupling layer 15 to the surface of dielectric layer 14 facing conductive polymer layer 16 can be enhanced. Therefore, the adhesion between dielectric layer 14 and conductive polymer layer 16 can be further improved. As a result, it is possible to achieve solid electrolytic capacitor 1 whose capacitance does not easily decline after long time use. Furthermore, voltage endurance characteristics of solid electrolytic capacitor 1 are also improved.

What is claimed is:

1. A solid electrolytic capacitor comprising:
   a positive electrode;
   a dielectric layer provided on the positive electrode;
   a silane coupling layer provided on the dielectric layer;
   a conductive polymer layer provided on the silane coupling layer; and
   a negative electrode layer provided on the conductive polymer layer,
   wherein the silane coupling layer comprises:
      a first silane coupling layer covering and directly contacting a first part of a surface of the dielectric layer facing the conductive polymer layer; and
      a second silane coupling layer covering and directly contacting at least a second part of the surface of the dielectric layer which is not covered by the first silane coupling layer, and
   wherein a surface of the conductive polymer layer which faces the dielectric layer is in direct contact with the first silane coupling layer and the second silane coupling layer.

2. The solid electrolytic capacitor according to claim 1, wherein
   the silane coupling layer further comprises a third silane coupling layer covering and directly contacting at least a third part of the surface of the dielectric layer that is not covered by the first and the second silane coupling layers.

3. The solid electrolytic capacitor of claim 2, wherein the surface of the conductive polymer layer which faces the dielectric layer is in direct contact with the first, second and third silane coupling layer.

4. A method for manufacturing a solid electrolytic capacitor, the method comprising:
   forming a dielectric layer on a positive electrode;

forming a first silane coupling layer on a first part of a surface of the dielectric layer;

immediately after the first silane coupling layer is formed, contacting an acid solution with a surface of the first silane coupling layer and a second part of the surface of the dielectric layer which is not covered by the first silane coupling layer;

immediately after the acid solution is contacted to the surface of the first silane coupling layer, forming a second silane coupling layer on at least the second part of the surface of the dielectric layer;

forming a conductive polymer layer on the first and the second silane coupling layers; and forming a negative electrode layer on the conductive polymer layer.

5. The method for manufacturing a solid electrolytic capacitor of claim 4, wherein a hydroxyl group is formed to the second part of the surface of the dielectric layer by contacting the acid solution with the surface of the first silane coupling layer and the second part of the surface of the dielectric layer.

6. The method for manufacturing a solid electrolytic capacitor of claim 4, wherein the contacting the acid solution is carried out by immersing the dielectric layer and the first silane coupling layer into the acid solution.

7. The method for manufacturing a solid electrolytic capacitor of claim 4, wherein the conductive polymer layer is formed on the first and the second silane coupling layers such that a surface of the conductive polymer layer which faces the dielectric layer is in direct contact with the first and the second silane coupling layers.

8. A solid electrolytic capacitor comprising:
a positive electrode;
a dielectric layer provided on the positive electrode;
a silane coupling layer provided on the dielectric layer;
a conductive polymer layer provided on the silane coupling layer; and
a negative electrode layer provided on the conductive polymer layer, wherein:

the silane coupling layer comprises:
a first silane coupling layer covering and directly contacting a first part of a surface of the dielectric layer facing the conductive polymer layer; and
a second silane coupling layer covering and directly contacting at least a second part of the surface of the dielectric layer which is not covered by the first silane coupling layer, the first silane coupling layer has a first surface contacting the dielectric layer and a second surface opposite to the first surface, and the second silane coupling layer covers and directly contacts an entirety of the second surface of the first silane coupling layer.

9. The solid electrolytic capacitor of claim 8, wherein the second silane coupling layer covers and directly contacts at least one side surface of the first silane coupling layer.

10. The solid electrolytic capacitor of claim 8, wherein the second silane coupling layer covers and directly contacts all side surfaces of the first silane coupling layer.

11. The solid electrolytic capacitor of claim 8,
wherein the silane coupling layer further comprises:
a third silane coupling layer covering and directly contacting at least a third part of the surface of the dielectric layer which is not covered by the first and second silane coupling layers.

12. The solid electrolytic capacitor of claim 11, wherein:
the third silane coupling layer has a first surface contacting the dielectric layer and a second surface opposite to the first surface, and
the second silane coupling layer is in direct contact with the second surface of the third silane coupling layer.

13. The solid electrolytic capacitor of claim 12, wherein the second silane coupling layer covers and directly contacts at least one side surface of the first silane coupling layer and at least one side surface of the third silane coupling layer.

* * * * *